Nov. 24, 1936.  A. WOLFF  2,061,643
VIEWING ATTACHMENT FOR CAMERAS
Filed April 20, 1936
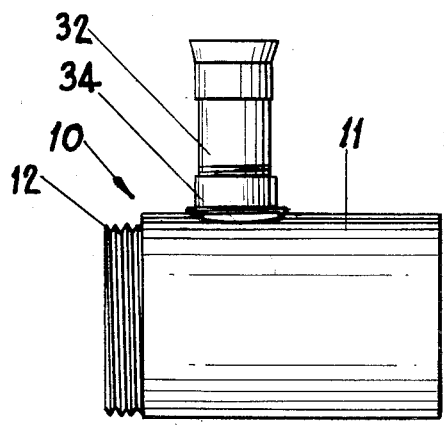
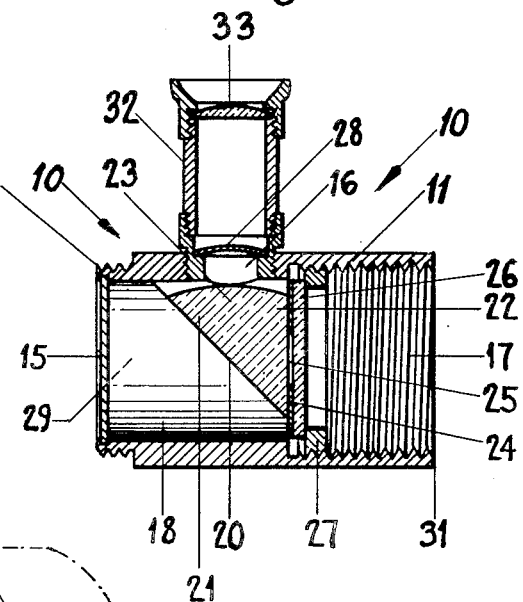
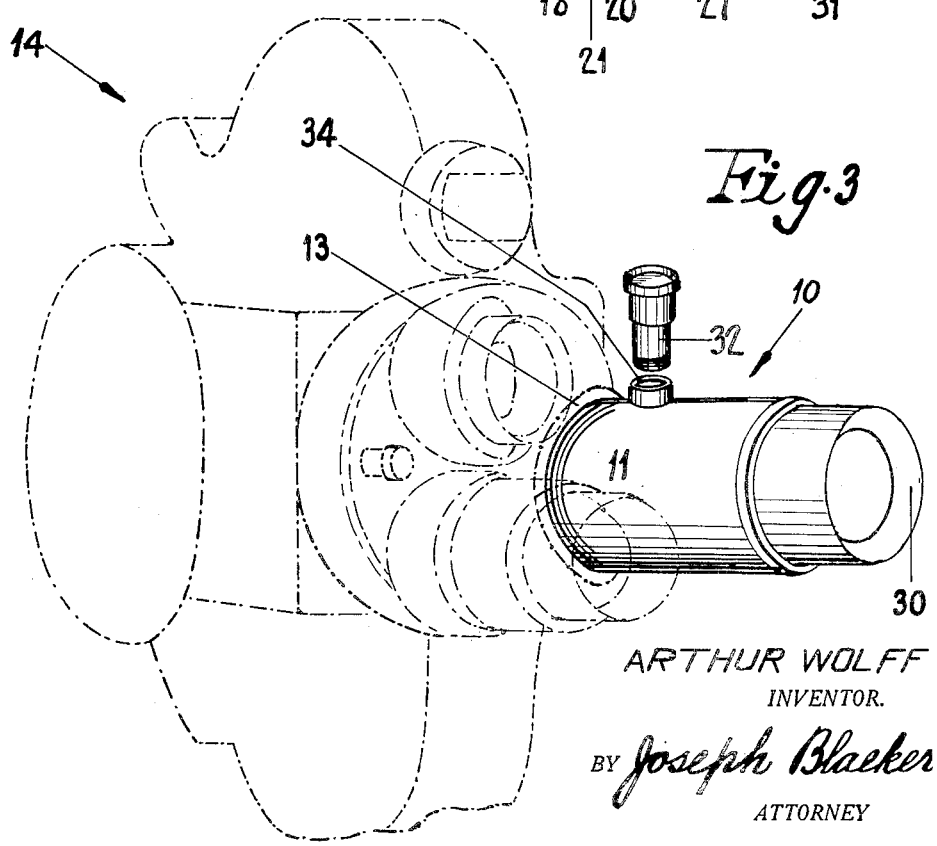
ARTHUR WOLFF
INVENTOR.
BY *Joseph Blacker*
ATTORNEY Patented Nov. 24, 1936

2,061,643

UNITED STATES PATENT OFFICE 2,061,643

VIEWING ATTACHMENT FOR CAMERAS

Arthur Wolff, Chicago, Ill.

Application April 20, 1936, Serial No. 75,267

3 Claims. (Cl. 88—1.5)

This invention relates to a viewing attachment which may be secured to a motion picture camera for the purpose of displaying to view from the exterior of the camera the image appearing directly along the axis of the photographic lens, in combination with means for preventing exposure of any part of the film to the light while the viewing attachment is in service position on the camera.

An object of this invention is to provide a simplified viewing attachment which may be readily mounted on a motion picture camera having the standard lens socket for interchangeable lenses, or on cameras of the single-lens type as well as on the three-lens turret cameras.

Another object of this invention is to provide a compact viewing instrument which will enable the 16 mm. camera user to determine the exact field, and to center and frame with certainty titles or other objects which may be placed at any distance from the camera.

Another object of this invention is to provide a viewing attachment comprising a tubular body having a closed and threaded end and an open end to receive a photographic lens, the said body having therein means for receiving rays of light from said lens and directing said rays through a lateral aperture closed by a crystal, and having a detachable magnifying member mounted in said lateral aperture.

Another object of this invention resides in the particular arrangement and structural features of the cooperating elements.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is an enlarged front elevation of the viewing attachment.

Figure 2 is a central cross-sectional view.

Figure 3 is a perspective view of a three-lens turret camera having a viewing attachment mounted in one of the lens sockets, and shows the detachable magnifying member in position for threading into unitary relation with the tubular body of the viewing attachment.

In the illustrated embodiment of the invention, the numeral 10 indicates a viewing attachment comprising a tubular body 11, having a threaded end 12 for connecting to a threaded lens receiving socket 13 of a camera 14. The threaded end 12 has been closed against the passage of light by means of an impervious member or metal disk 15 which is pressed tightly into the tubular body 11.

The tubular body 11 has an aperture 16 facing laterally and an open end 17 having a thread of the same size as that in the socket 13. A plug 18 having an angular face 20 has been inserted in the tubular body 11 with an end face in contact with the disk 15 and with the angular face 20 facing the aperture 16. The face 20 is adapted to support a ninety degree prism 21 with one refracting surface 22 facing the open end 17 and with the other refracting surface 23 facing laterally in alignment with the lateral aperture 16. The prism 21 is located in the tubular body 11 between the plug 18 and the open end of said body.

A mask or opaque frame 24 having an opening 25 of the same size as the exposure opening in the camera, has been placed in contact with the refracting surface 22 of the prism 21. A ground glass or translucent image fixing member 26 has been placed in contact with the mask 24. The ground glass 26 and mask 24 are located in the body 11 between the prism 21 and the open end of said body. An annular nut 27 in threaded engagement with the thread in the open end 17, serves to secure the members 18, 21, 24 and 26 in operating relation in the tubular body 11 and in tight frictional engagement with the disk 15.

A crystal 28 has been secured air-tight in the aperture 16. It will be seen, by reference to Figure 2, that the members 15, 26, and 28 prevent dust, moisture, or other foreign matter entering the tubular body compartment 29 in which the prism 21 is housed.

In applying my viewing attachment 10 to the camera 14, the taking lens 30 is removed and the tubular body 11 is screwed into the lens receiving socket 13 of the camera. The lens, of any focal length, is then mounted in the open end 17 of the tubular body. The distance between the ground surface of the ground glass 26 and the front edge 31 of the tubular body 11 is exactly the same as the distance between the emulsion of the film in the camera and the front edge of the lens socket on the camera. The image appearing directly along the axis of the photographic lens is formed on the ground glass 26 and passes through the opening 25 in the mask 24 to the prism 21. The oblique side of the prism 21 acts as a light reflecting surface so that light entering the open end 17 of the tubular body 11 will be reflected upwardly through the lateral aperture 16. As shown in Figure 2, the lateral refracting surface 23 of the prism has been made spherical so as to magnify the image. In practice, the surface 23 doubles the size of the image produced on the ground glass by the photographic lens.

A viewing tube 32 carrying a magnifying lens 33 has been mounted in the lateral aperture 16 with the lens 33 in alignment with the magnifying surface 23 of the prism. The user can thus see a repeatedly magnified representation of the image on the ground glass. In practice, the observed image is magnified about eight times.

Figure 3 shows a turret camera having two other lenses in addition to the lens 30. In order to permit mounting of the viewing attachment 10 in the threaded socket 13, without striking the other lenses with the laterally projecting viewing tube 32, I have provided a threaded socket 34 fixed to the tubular body 11 and have threaded the lower end of the tube 32. This threaded connection makes it possible to first thread in the tubular body 11 and then to thread in the viewing tube 32 in operative position.

It is thus to be noted that the viewing tube 32 is removably mounted and that the prism 21 always remains fixed in an air-tight compartment in which no foreign matter may enter to spoil the view of the magnified image.

I claim:

1. A viewing attachment for motion picture cameras having a threaded lens receiving socket, comprising a tubular body having a lateral aperture and a threaded end for connecting to said socket, means for closing said threaded end, a light reflecting surface angularly disposed in said tubular body below the lateral aperture so that light entering the open end will be reflected upwardly through the lateral aperture, a mask adjoining said light reflecting surface and having an aperture of the same size as the picture normally projected on the film strip, a translucent image fixing member adjoining said mask on to which rays of light are directed, a photographic lens mounted in the open end of said tubular body, a crystal secured air-tight in said lateral aperture and causing said light reflecting surface to be maintained in an air-tight compartment in said tubular body, and a viewing tube removably mounted in said lateral aperture and above said crystal and having a magnifying lens in alignment with the lateral refracting surface of said prism for displaying to view from the exterior of the camera the image on said ground glass as it appears directly along the axis of said photographic lens.

2. A viewing attachment for motion picture cameras having a threaded lens receiving socket, comprising a tubular body having a threaded end for connecting to said socket, a member inserted in said threaded end for closing said end, a prism in said tubular body having a magnifying surface, an angular plug designed to support said prism with one surface facing the open end of said tubular body and with said magnifying surface facing laterally, a mask adjoining said prism and having an aperture of the same size as the picture normally projected on the film strip, a translucent image fixing member adjoining said mask on to which rays of light are directed, a photographic lens mounted in the open end of said tubular body, said tubular body having an aperture in alignment with said lateral magnifying surface of said prism and having a transparent member closing said aperture, a viewing tube removably mounted in alignment with said lateral aperture and having a magnifying lens at one end, and thereby displaying to view from the exterior of the camera a repeatedly magnified representation of the image on said ground glass as it appears directly along the axis of said photographic lens.

3. In a motion picture camera having a lens receiving means, a viewing attachment comprising a tubular body having a lateral aperture and being designed at one end for connecting to said receiving means, a member inserted in said connecting end for closing said end, a prism in said tubular body having one flat surface and one magnifying surface disposed in right-angular relation, an angular member designed to support said prism with said flat surface facing the open end of said tubular body and with said spherical magnifying surface facing said lateral aperture, a mask adjoining said prism and having an aperture of the same size as the picture normally projected on the film strip, a translucent image fixing member adjoining said mask on to which rays of light are directed, a photographic lens mounted in the open end of said tubular body, and a magnifying lens in alignment with the lateral magnifying surface of said prism for displaying to view from the exterior of the camera a repeatedly magnified representation of the image on said ground glass as it appears directly along the axis of said photographic lens.

ARTHUR WOLFF.